(12) United States Patent
Turner et al.

(10) Patent No.: US 9,365,402 B2
(45) Date of Patent: Jun. 14, 2016

(54) COMMUNICATION ASSEMBLY

(71) Applicants: Joseph Turner, Mc Cordsville, IN (US); Forrest Hutchinson, Mc Cordsville, IN (US)

(72) Inventors: Joseph Turner, Mc Cordsville, IN (US); Forrest Hutchinson, Mc Cordsville, IN (US)

( * ) Notice: Subject to any disclaimer, the term of this patent is extended or adjusted under 35 U.S.C. 154(b) by 209 days.

(21) Appl. No.: 14/459,715

(22) Filed: Aug. 14, 2014

(65) Prior Publication Data
US 2016/0046471 A1 Feb. 18, 2016

(51) Int. Cl.
*G08B 21/00* (2006.01)
*B66F 11/04* (2006.01)
*G05B 15/02* (2006.01)
*B66F 17/00* (2006.01)

(52) U.S. Cl.
CPC ............. *B66F 11/044* (2013.01); *B66F 17/006* (2013.01); *G05B 15/02* (2013.01)

(58) Field of Classification Search
CPC ...... B66F 11/044; B66F 17/006; G05B 15/02
USPC .......................................................... 340/540
See application file for complete search history.

(56) References Cited

U.S. PATENT DOCUMENTS

| | | | |
|---|---|---|---|
| 5,142,658 A | 8/1992 | McMorran et al. | |
| 6,838,996 B2 | 1/2005 | Deimel | |
| 7,672,768 B2 | 3/2010 | Narisawa et al. | |
| 7,937,162 B2* | 5/2011 | Thomson | G05B 19/409 340/425.5 |
| 2008/0053945 A1 | 3/2008 | Schneider et al. | |
| 2008/0165025 A1* | 7/2008 | Morath | G08C 17/02 340/4.36 |
| 2009/0145871 A1* | 6/2009 | Bond | B66F 11/046 212/285 |

* cited by examiner

*Primary Examiner* — Kerri McNally

(57) ABSTRACT

A communication assembly includes a crane structured to elevate a platform coupled to the crane. A remote unit is held by a first user in the platform of the crane. A remote processor is coupled to the remote unit. A remote transceiver is coupled to the remote unit. A pair of sticks is coupled to the remote unit. The sticks are manipulated by the first user to issue a selected one of a plurality of movement commands with respect to the platform of the crane. A base unit is positioned within a cab of the crane. A base processor is coupled to the base unit. A base transceiver receives the movement commands from the pair of sticks. A display is coupled to the base unit and displays indicia relating to the movement commands. The second user manipulates the platform of the crane to correspond to the movement commands.

17 Claims, 5 Drawing Sheets

COMMUNICATION ASSEMBLY

BACKGROUND OF THE DISCLOSURE

Field of the Disclosure

The disclosure relates to communication devices and more particularly pertains to a new communication device for providing non verbal communication during operation of a crane.

SUMMARY OF THE DISCLOSURE

An embodiment of the disclosure meets the needs presented above by generally comprising a crane structured to elevate a platform coupled to the crane. A remote unit is held by a first user in the platform of the crane. A remote processor is coupled to the remote unit. A remote transceiver is coupled to the remote unit. The remote transceiver is electrically coupled to the remote processor. A pair of sticks is movably coupled to the remote unit. The sticks are electrically coupled to the remote processor. The sticks are manipulated by the first user to issue a selected one of a plurality of movement commands with respect to the platform of the crane. A plurality of actuators is coupled to the remote unit. The actuators are electrically coupled to the remote processor. A base unit is positioned within a cab of the crane. The base unit is visible to a second user in the cab of the crane. A base processor is coupled to the base unit. A base transceiver is coupled the base unit. The base transceiver is electrically coupled to the base processor. The base transceiver is in communication with the remote transceiver so the base transceiver receives the movement commands from the pair of sticks. A display is coupled to the base unit. The display is electrically coupled to the base processor. The display displays indicia relating to the movement commands. The second user may manipulate the platform of the crane in a direction that corresponds to the movement commands.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
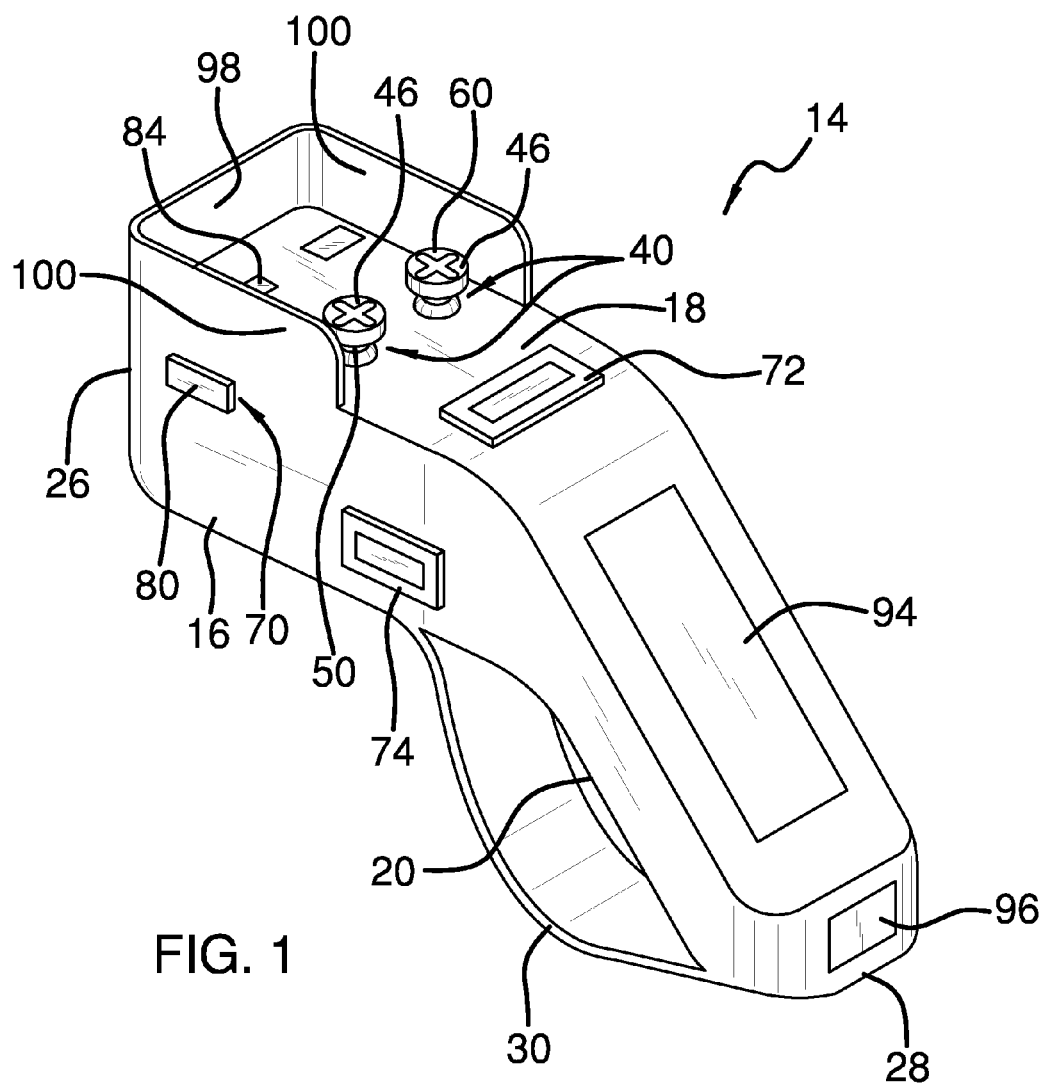
FIG. 1 is a perspective view of a remote unit of a communication assembly according to an embodiment of the disclosure.
Figure 3:
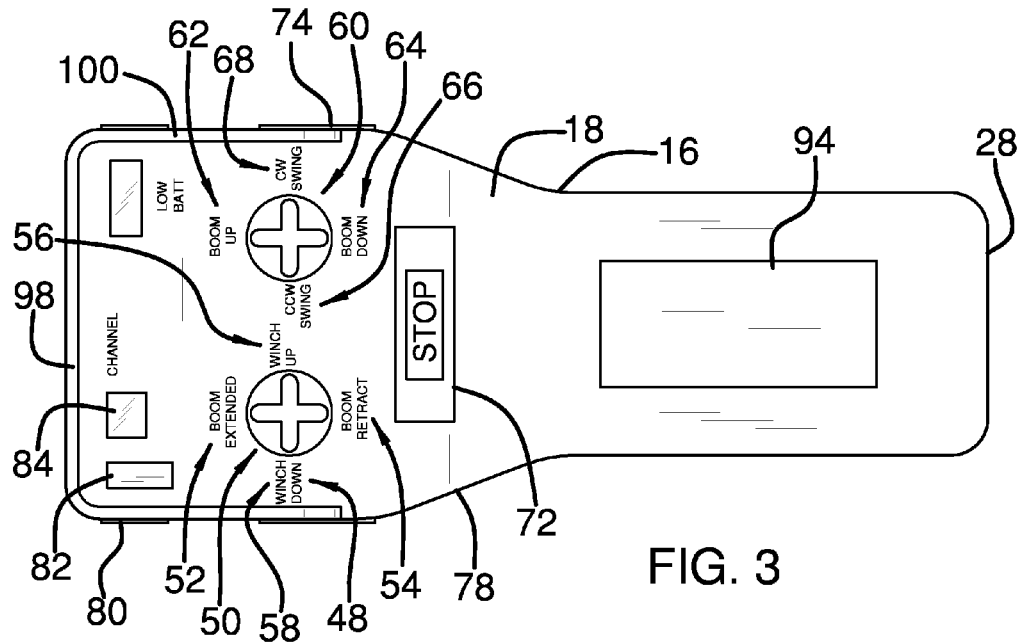
FIG. 3 is a top view of the remote unit of an embodiment of the disclosure.
Figure 2:
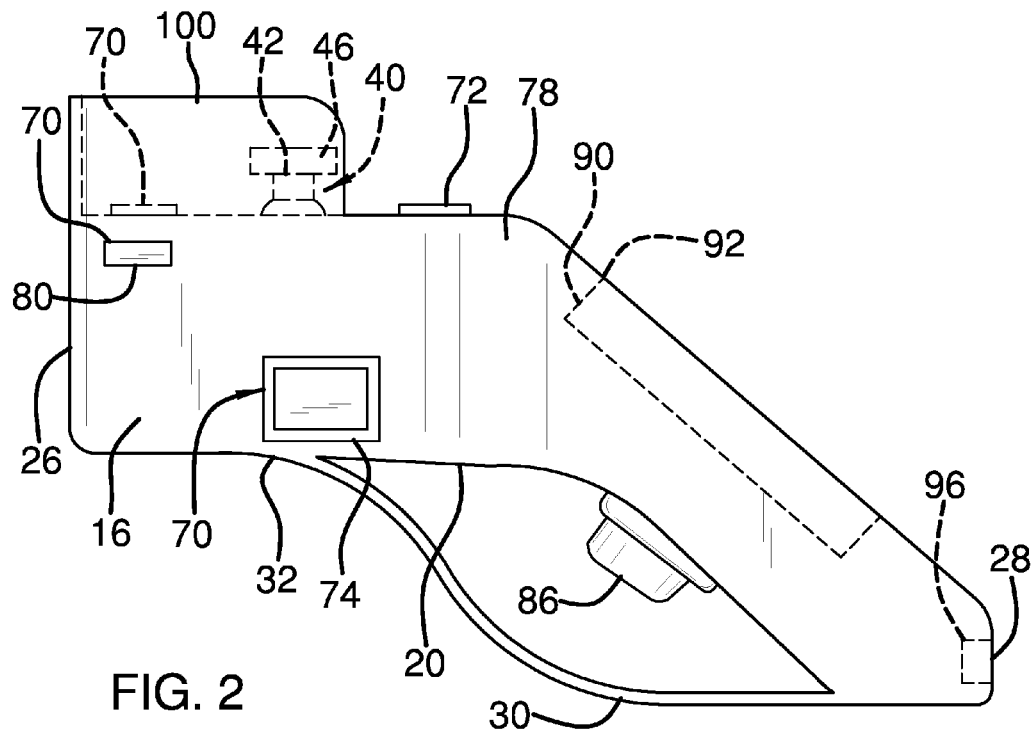
FIG. 2 is a left side view of the remote unit of an embodiment of the disclosure.
Figure 4:
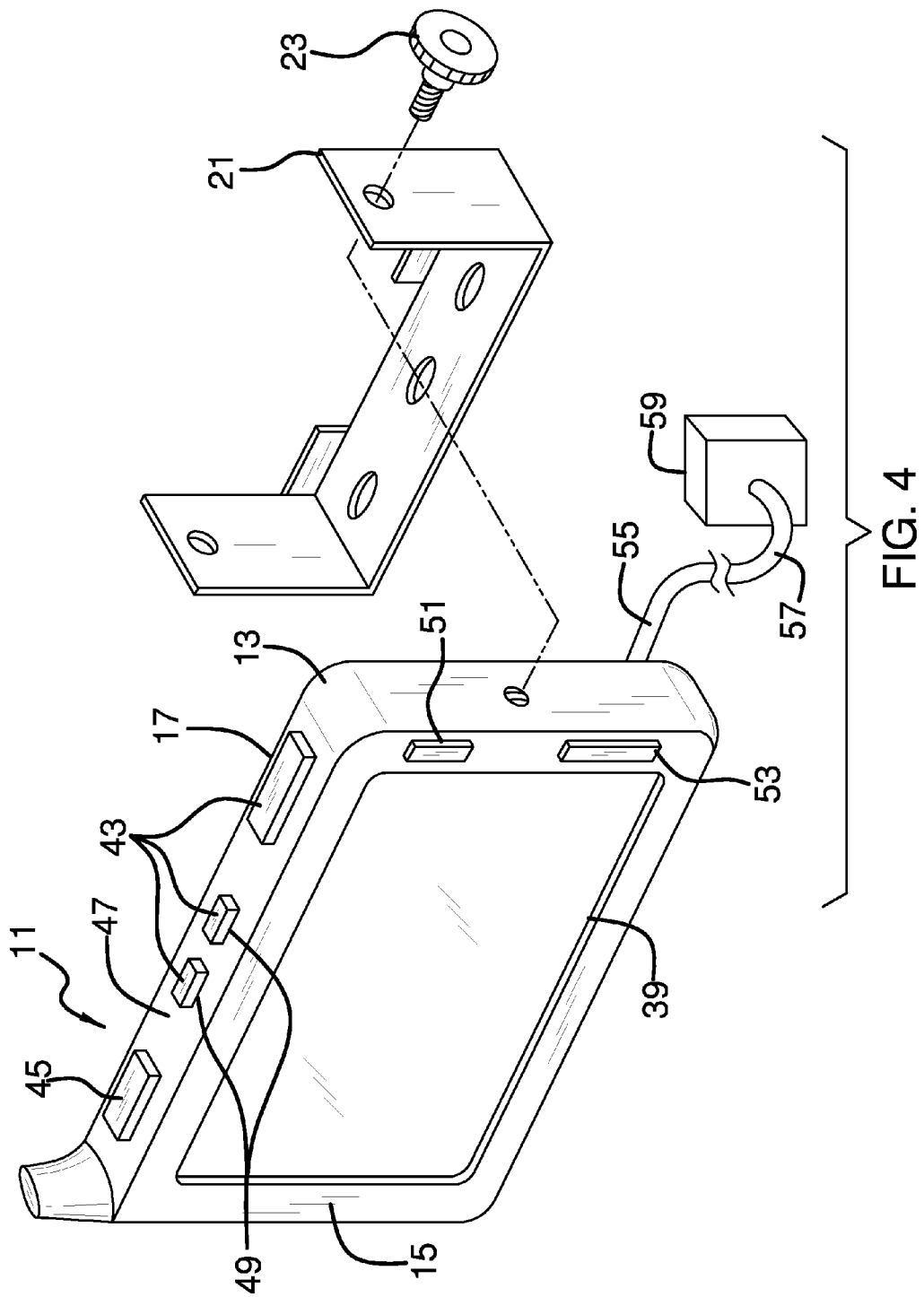
FIG. 4 is a perspective view of base unit of an embodiment of the disclosure.
Figure 5:
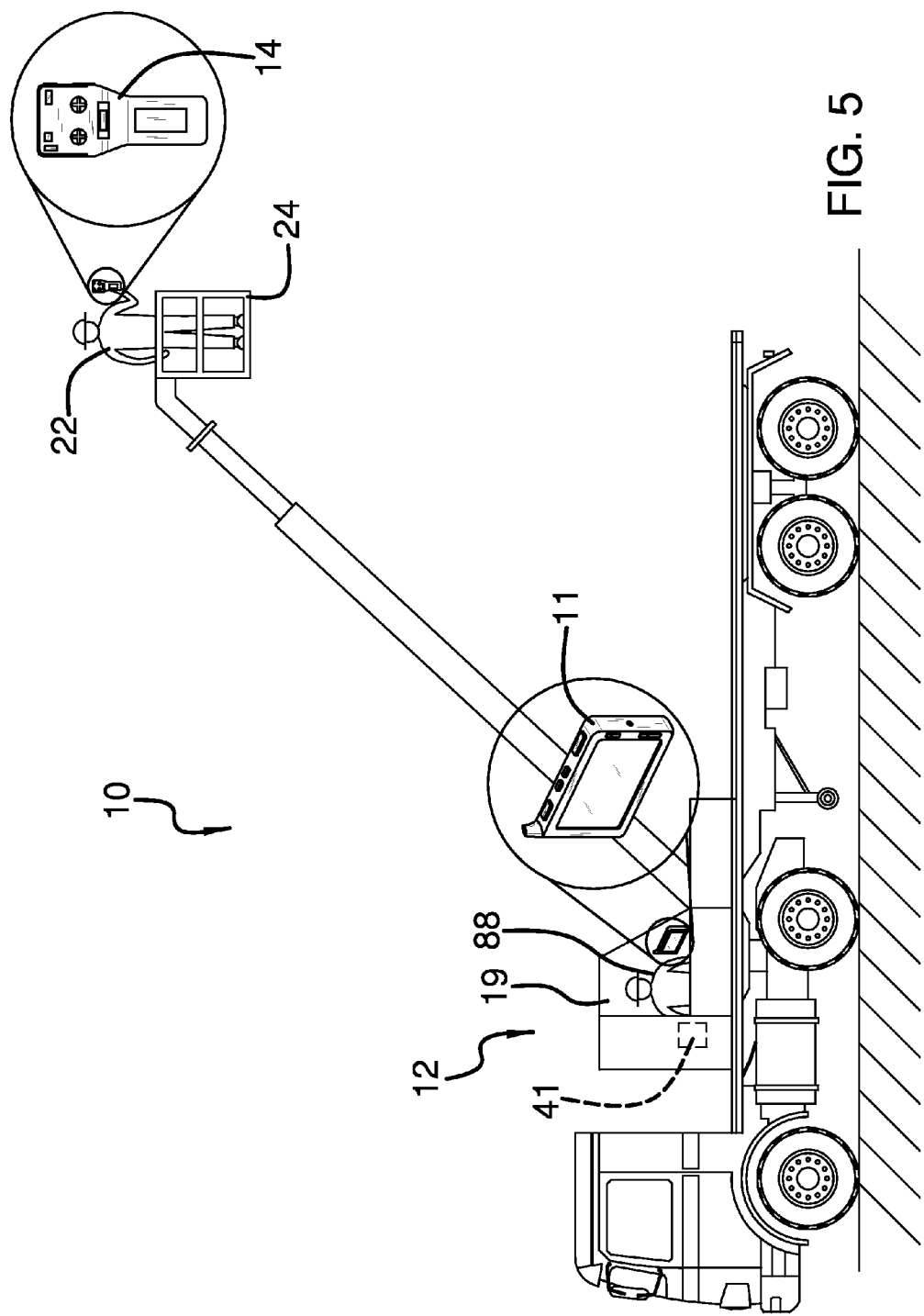
FIG. 5 is an in-use view of an embodiment of the disclosure.
Figure 6:
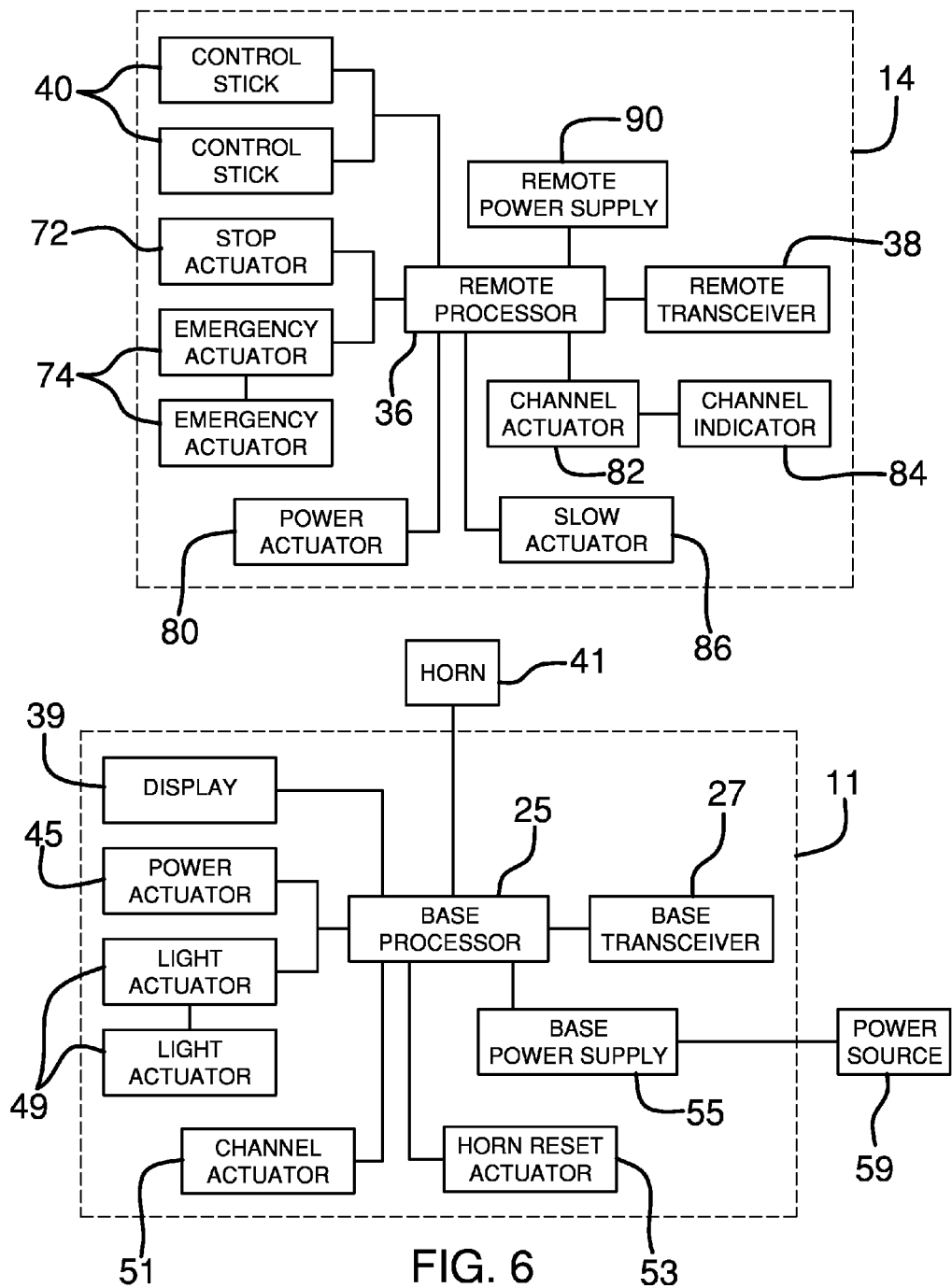
FIG. 6 is a schematic view of an embodiment of the disclosure.

With reference now to the drawings, and in particular to FIGS. 1 through 6 thereof, a new communication device embodying the principles and concepts of an embodiment of the disclosure and generally designated by the reference numeral 10 will be described.

As best illustrated in FIGS. 1 through 6, the communication assembly 10 generally comprises a crane 12. The crane 12 may be a crane of any conventional design. A remote unit 14 is provided. The remote unit 14 has an outer wall 16 extending between a top wall 18 and a bottom wall 20 of the remote unit 14. The remote unit 14 is held by a first user 22 located proximate a platform 24 of the crane 12.

The top wall 18 of the remote unit 14 may curve downwardly between a front side 26 and a back side 28 of the outer wall 16 of the remote unit 14. The bottom wall 20 of the remote unit 14 may be curvilinear with respect to the top wall 18 of the remote unit 14. A shield 30 has a first end 32 and a second end 34. The shield 30 is curved between the first 32 and second 34 ends. Each of the first 32 and second 34 ends of the shield 30 is coupled to the bottom wall 20 of the remote unit 14.

A remote processor 36 is coupled to the remote unit 14. The remote processor 36 may be an electronic processor of any conventional design. A remote transceiver 38 is coupled to the remote unit 14. The remote transceiver 38 is electrically coupled to the remote processor 36. The remote transceiver 38 may be a multi-channel RF transceiver of any conventional design.

A pair of sticks 40 is provided. The sticks 40 each have a top end 42 and a bottom end 44. The bottom end 44 of the pair of sticks 40 is each movably coupled to the top wall 18 of the remote unit 14. Moreover, the pair of sticks 40 is accessible to the first user 22. A flange 98 may extend from the front side 26 and side portions 100 of the flange 98 extend around the top wall 18 adjacent to the sticks 40 to restrict access to the sticks 40 and inhibit inadvertent movement of the sticks 40. A knob 46 is coupled to the top end 42 of each of the sticks 40. The sticks 40 are each electrically coupled to the remote processor 36. The sticks 40 are manipulated by the first user 22 to issue a selected one of a plurality of movement commands with respect to the platform 24 of the crane 12.

Indicia 48 are printed on the top wall 18 of the remote unit 14. The indicia 48 are arranged around each of the sticks 40. Additionally, the indicia 48 indicate the plurality of movement commands. The indicia 48 around a first one 50 of the sticks 40 may comprise the words "boom extended" 52, "boom retract" 54, "winch up" 56 and "winch down" 58. The indicia 48 around a second one 60 of the sticks 40 may comprise the words "boom up" 62, "boom down" 64, "ccw swing" 66 and "cw swing" 68. A selected one of the movement commands is communicated to the remote processor 36 when the first 50 and second 60 sticks are urged toward the associated movement command.

A plurality of actuators 70 is coupled to the remote unit 14. The actuators 70 are electrically coupled to the remote processor 36. A stop one 72 of the actuators 70 is coupled to the top wall 18 of the remote unit 14. The stop actuator 72 issues a stop command with respect to the platform 24 on the crane 12 when the first user 22 engages the stop actuator 72. A pair of emergency ones 74 of the actuators 70 is each coupled to an associated one of a first lateral side 76 and a second lateral side 78 of the outer wall 16 of the remote unit 14. The emergency actuators 74 issue an emergency command with respect to the platform 24 on the crane 12 when the first user 22 engages the emergency actuators 74.

A power one 80 of the actuators 70 is coupled to the first lateral side 76 of the outer wall 16 of the remote unit 14. The power actuator 80 is positioned proximate front side 26 of the outer wall 16 of the remote unit 14. The power actuator 80 actuates the remote processor 36. A channel one 82 of the actuators is coupled to the top wall 18 of the remote unit 14. The channel actuator 82 selects a channel utilized by the remote transceiver 38. A channel indicator 84 is coupled to the top wall 18 of the remote unit 14. The channel indicator 84 is electrically coupled to the channel actuator 82. The channel indicator 84 displays the selected channel.

A slow one 86 of the actuators 70 is coupled to the bottom wall 20 of the remote unit 14. The shield 30 surrounds the slow actuator 86. The slow actuator 86 issues a slow command when the first user 22 engages the slow actuator 86 in conjunction with the sticks 40. The slow actuator 86 notifies a second user 88 to slowly move the platform 24 of the crane 12 in the selected direction.

A remote power supply 90 is coupled to the remote unit 14. The remote power supply 90 is electrically coupled to the remote processor 36. The remote power supply 90 comprises at least one battery 92. A battery cover 94 is removably coupled to the top wall 18 of the remote unit 14. Additionally, the battery cover 94 is positioned proximate the back side 28 of the outer wall 16 of the remote unit 14. A release 96 is coupled to the back side 28 of the outer wall 16 of the remote unit 14. The release 96 releases the battery 92 from the remote unit 14 when the release 96 is engaged.

A base unit 11 is provided. The base unit 11 has an exterior wall 13 extending between each of a front wall 15 and a back wall 17 of the base unit 11. The base unit 11 is positioned within a cab 19 of the crane 12. The base unit 11 is visible to the second user 88 in the cab 19 of the crane 12.

A mount 21 is provided. A screw 23 extends through the mount 21 and engages the base unit 11. The screw 23 retains the base unit 11 on the mount 21. The mount 21 is coupled to the cab 19 of the crane 12. The mount 21 retains the base unit 11 in the cab 19 of the crane 12.

A base processor 25 is coupled to the base unit 11. The base processor 25 may be an electronic processor of any conventional design. A base transceiver 27 is coupled the base unit 11. The base transceiver 27 is electrically coupled to the base processor 25. Moreover, the base transceiver 27 is in electromagnetic communication with the remote transceiver 38. The base transceiver 38 receives the movement commands from the pair of sticks 40. The base transceiver 38 may be a multichannel RF transceiver of any conventional design.

A display 39 is provided. The display 39 is coupled to the front wall 15 of the base unit 11 so the display 39 is visible to the second user 88. The display 39 is electrically coupled to the base processor 25. The display 39 may be an LCD display of any conventional design. The display 39 displays indicia 48 relating to the movement commands issued by the sticks 40, the stop actuator 72, the emergency actuators 74 and the slow actuator 86. The indicia 48 comprise words communicating each of the movement commands to the second user 88. The second user 88 may manipulate the platform 24 of the crane 12 in a direction that corresponds to the movement commands.

The display 39 issues an emergency visual alert when the first user 22 engages the emergency actuators 74. The display 39 flashes a red color to visually alert the second user 88 to an emergency situation. The base processor 25 is electrically coupled to a horn 41 on the crane 12. The horn 41 issues an audible alarm when the first user 22 engages the emergency actuators 74. The second user 88 is audibly notified of the emergency situation.

A plurality of actuators 43 is coupled to the base unit 11. Each of the actuators 43 on the base unit 11 are electrically coupled to the base processor 25. A power one 45 of the actuators 43 is coupled to an upper side 47 of the exterior wall 13 of the base unit 11. The power actuator 45 actuates the base processor 25. A pair of light actuators 49 is coupled to the upper side 47 of the exterior wall 13 of the base unit 11. The light actuators 49 increase or decrease a brightness of the display 39.

A channel one 51 of the actuators 43 is coupled to the front wall 15 of the base unit 11. The channel actuator 51 is electrically coupled to the base processor 25. The channel actuator 51 selects a channel utilized by the base transceiver 27. A horn reset one 53 of the actuators 43 is coupled to the front wall 15 of the base unit 11. The horn reset actuator 53 is electrically coupled to the base processor 25. The horn reset actuator 53 resets the horn 41 after the horn 41 issues the audible alarm.

A base power supply 55 is coupled to the base unit 11. The base power supply 55 is electrically coupled to the base processor 25. Additionally, the base power supply 55 comprises a power cord 57 extending outwardly from the exterior wall 13 of the base unit 11. The power cord 57 is electrically coupled to a power source 59. The power source 59 may be an electrical system in the crane 12.

In use, the first user 22 and second user 88 each utilizes the assembly 10 to non-verbally communicate with each other. The assembly 10 prevents miscommunication between the first 22 and second 88 users due to noise or other distractions. The assembly 10 may also utilize language selection for the base unit 11 and the remote unit 14 allowing translation of communications between the first user 22 and the second user 88. Additionally, the assembly 10 increases a level of safety during operation of the crane 12. The assembly 10 additionally eliminates the need of hand signals between the first user 22 and the second user 88.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A communication assembly comprising:
a crane structured to elevate a platform coupled to said crane;
a remote unit held by a first user located proximate said platform of said crane;
a remote processor coupled to said remote unit;
a remote transceiver coupled to said remote unit, said remote transceiver being electrically coupled to said remote processor;
a pair of sticks movably coupled to said remote unit, said sticks being electrically coupled to said remote processor, said sticks being manipulated by the first user to issue a selected one of a plurality of movement commands with respect to said platform of said crane;
a plurality of actuators coupled to said remote unit, said actuators being electrically coupled to said remote processor;
a base unit positioned within a cab of said crane such that said base unit is visible to a second user in said cab of said crane;
a base processor coupled to said base unit;
a base transceiver coupled said base unit, said base transceiver being electrically coupled to said base processor, said base transceiver being in communication with said remote transceiver such that said base transceiver receives said movement commands from said pair of sticks; and
a display coupled to said base unit, said display being electrically coupled to said base processor, said display displaying indicia relating to said movement commands such that the second user may manipulate said platform of said crane in a direction that corresponds to said movement commands.

2. The assembly according to claim 1, further comprising said remote unit having an outer wall extending between a top wall and a bottom wall of said remote unit.

3. The assembly according to claim 2, further comprising said pair of sticks each being movably coupled to said top wall of said remote unit such that said pair of sticks are accessible to the first user.

4. The assembly according to claim 2, further comprising a stop one of said actuators being coupled to said top wall of said remote unit, said stop actuator issuing a stop command with respect to said platform on said crane when the first user engages said stop actuator.

5. The assembly according to claim 2, further comprising a pair of emergency ones of said actuators each being coupled to an associated one of a first lateral side and a second lateral side of said outer wall of said remote unit, said emergency actuators issuing an emergency command with respect to said platform on said crane when the first user engages said emergency actuators.

6. The assembly according to claim 1, further comprising said base unit having an exterior wall extending between each of a front wall and a back wall of said base unit.

7. The assembly according to claim 6, further comprising said display being coupled to said front wall of said base unit such that said display is visible to the second user.

8. The assembly according to claim 1, further comprising said base processor being electrically coupled to a horn on said crane.

9. The assembly according to claim 8, further comprising:
a pair of emergency actuators coupled to said remote unit; and
said horn issuing an audible alarm when the first user engages said emergency actuators such that the second user is notified of an emergency situation.

10. The assembly according to claim 1, further comprising a remote power supply coupled to said remote unit.

11. The assembly according to claim 10, further comprising said remote power supply being electrically coupled to said remote processor.

12. The assembly according to claim 11, further comprising said remote power supply comprising at least one battery.

13. The assembly according to claim 1, further comprising a base power supply coupled to said base unit.

14. The assembly according to claim 13, further comprising said base power supply being electrically coupled to said base processor.

15. The assembly according to claim 14, further comprising said base power supply comprising a power cord extending outwardly from an exterior wall of said base unit.

16. The assembly according to claim 15, further comprising said power cord being electrically coupled to a power source.

17. A communication assembly comprising:
a crane;
a remote unit, said remote unit having an outer wall extending between a top wall and a bottom wall of said remote unit, said remote unit being held by a first user located proximate a platform of said crane;
a remote processor coupled to said remote unit;
a transceiver coupled to said remote unit, said remote transceiver being electrically coupled to said remote processor;
a pair of sticks, said pair of sticks each being movably coupled to said top wall of said remote unit such that said pair of sticks are accessible to the first user, said sticks being electrically coupled to said remote processor, said sticks being manipulated by the first user to issue a selected one of a plurality of movement commands with respect to said platform of said crane;
a plurality of actuators coupled to said remote unit, said actuators being electrically coupled to said remote processor;
a stop one of said actuators being coupled to said top wall of said remote unit, said stop actuator issuing a stop command with respect to said platform on said crane when the first user engages said stop actuator;
a pair of emergency ones of said actuators each being coupled to an associated one of a first lateral side and a second lateral side of said outer wall of said remote unit, said emergency actuators issuing an emergency command with respect to said platform on said crane when the first user engages said emergency actuators;
a remote power supply coupled to said remote unit, said remote power supply being electrically coupled to said remote processor, said remote power supply comprising at least one battery;
a base unit, said base unit having an exterior wall extending between each of a front wall and a back wall of said base unit, said base unit being positioned within a cab of said crane such that said base unit is visible to a second user in said cab of said crane;
a base processor coupled to said base unit;
a base transceiver coupled said base unit, said base transceiver being electrically coupled to said base processor, said base transceiver being in communication with said remote transceiver such that said base transceiver receives said movement commands from said pair of sticks; and a display, said display being coupled to said front wall of said base unit such that said display is visible to the second user, said display being electrically coupled to said base processor, said display displaying indicia relating to said movement commands such that the second user may manipulate said platform of said crane in a direction that corresponds to said movement commands;

said base processor being electrically coupled to a horn on said crane, said horn issuing an audible alarm when the first user engages said emergency actuators such that the second user is notified of an emergency situation; and a base power supply coupled to said base unit, said base power supply being electrically coupled to said base processor, said base power supply comprising a power cord extending outwardly from said exterior wall of said base unit, said power cord being electrically coupled to a power source.

* * * * *